3,752,736
CONTROL ROD ARRANGEMENT PARTICULARLY FOR BOILING WATER REACTORS

Heinz Kornbichler, Falkenstein, and Peter Seidle, Niederneisen, Germany, assignors to Licentia Patent-Verwaltungs-GmbH, Frankfurt am Main, Germany
Filed Sept. 30, 1971, Ser. No. 185,143
Claims priority, application Germany, Sept. 30, 1970,
P 20 48 029.9
Int. Cl. G21c 7/10
U.S. Cl. 176—36 R                 5 Claims

ABSTRACT OF THE DISCLOSURE

An improved control rod arrangement for a nuclear reactor, and in particular a boiling water reactor, of the type wherein the absorber portion of the control rod has a cross-shaped cross section, a coaxial guide tube is provided for guiding the control rod outside of the reactor and the control rod is provided with a lifting piston which cooperates with a lifting cylinder to insert the control rod into the reactor core from the bottom. According to the invention, the control rod guide tube is designed to simultaneously serve as the lifting cylinder and the absorber portion of the control rod is designed so that the four wings of the cross-shaped cross section will pass over the control rod guide tube, e.g. by providing each of the wings with an upwardly extending slit.

BACKGROUND OF THE INVENTION

The present invention relates to nuclear reactors, and in particular to a control rod arrangement for a nuclear reactor. Control rods with cross-shaped portions of a neutron absorbing material have been found to be useful for nuclear reactors, particularly for boiling water reactors. The four absorber wings of the cross-shaped portion of each control rod extend in the reactor core into the spaces between each four fuel element bundles and can thus absorb a maximum of neutrons with the lowest possible space requirement. Such an arrangement may be found, for example, in French Pat. No. 1,518,661, and particularly in FIGS. 2 and 3 thereof.

Due to the low steam bubble concentration in the lower portion of the reactor core, the effectiveness of absorber rods is greatest in that area. It is therefore the custom to insert the control rods into boiling water reactors from the bottom. For this purpose, a guide tube is provided below the reactor core for each control rod into which the control rod can be completely inserted. The control rod itself is connected via a further rod with a lifting piston which slides in a lifting cylinder disposed coaxially below the guide tube and which is formed by a downward extension of the guide tube. By charging the area below the lifting piston in the lifting cylinder with a pressure medium, the absorber rod is inserted into the core. Such an embodiment is also disclosed in the above-mentioned French Pat. No. 1,518,661.

The drawback of this arrangement is that the guide tubes must have a diameter such that the control rods can be inserted thereinto. This results in the flow cross section below the reactor core being substantially reduced. Furthermore, this type of arrangement requires that the structural height below the reactor core be about twice the height of the absorber portion.

The East German Pat. No. 42,788 discloses an arrangement for reactors in which the control rods are inserted into the core from the top, wherein the control rods are constructed as hollow cylinders which are closed on one side and into which the guide tubes extend. Through the guide tubes the pressure medium which effects the movement of the absorber body is pressed into the hollow cylinder or out of it. With this arrangement the structural height required outside of the reactor core is only about the same as that of the absorber portion of the control rod. However, if this solution were employed for control rods with cross-shaped absorber portions, these portions would have to form a hollow cylinder in their center which would increase the space required in the reactor core. In addition, it is presently desired to find driving means which permit the insertion of the control rods into the reactor core by means of a propellant since with insertion merely by means of gravity the danger of jamming is often considered to be too great. Previously, control rods were often disposed above the core so that they would automatically be inserted into the core if the propellant should malfunction. For piston-operated control rods, however, arrangements have been discovered in the meantime with which a pressure medium acts on the actuating piston to bring the control rod out of the core and when this medium is missing the reactor pressure itself acting on the opposite side of the piston will automatically insert the rod into the core. Such an arrangement is disclosed in the copending U.S. application Ser. No. 170,878 filed Aug. 11, 1971 by Jean Mattern, Peter Daublesky and Gunter Zertzshel, entitled "Control Rod Drive in the Interior of a Pressure Vessel," and is assigned to the same assignee as the present application.

SUMMARY OF THE INVENTION

It it therefore the object of the present invention to provide a control rod arrangement with which the flow cross section below the reactor core is reduced as little as possible and in which the control rod is actuated by a lifting piston but which nevertheless requires only about the same structural height as the absorbing portion of the control rod outside the reactor core.

This is accomplished for a nuclear reactor control rod arrangement which is provided with a lifting piston and with an absorber portion having a cross-shaped cross section formed by four wings, and a coaxial control rod guide tube for guiding the control rod outside of the reactor core, in that the control rod guide tube is simultaneously designed as the lifting cylinder for the lifting piston and the absorber portion of the control rod is designed so that it passes over the control rod guide tube when the rod is removed from the reactor core.

According to the preferred embodiment of the present invention the wings of the absorber portion are all provided with vertical slits which extend upwardly from the lower edges thereof and are spaced uniformly from their coordinate origin. When the control rod is removed from the reactor core, the wall of the control rod guide tube extends into these slits so that the wings extend over the control rod guide tube along the outer surface thereof.

According to a further feature of the preferred embodiment, the outer surface of the control rod guide tube is provided with four pockets each having the shape of one of the wings of the absorber portion of the control rod and into which the respective wings extend when the control rod is removed from the reactor core.

DESCRIPTION OF THE PREFERRED EMBODIMENTS

Figure 1:
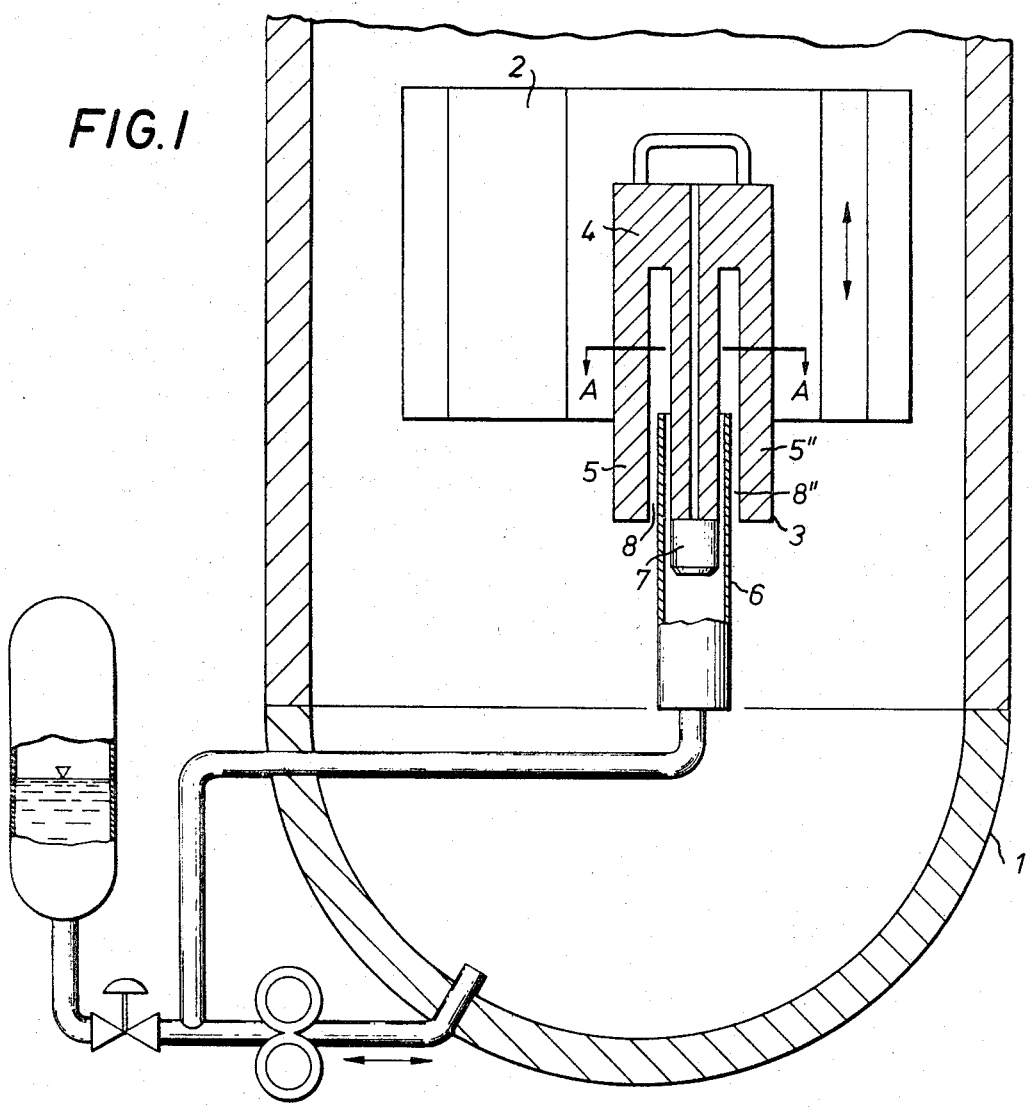
FIG. 1 is a vertical sectional view of the lower portion of a nuclear reactor pressure vessel with a schematic representation of a control rod arrangement according to the present invention.

Referring now to FIG. 1 there is shown the lower portion of a nuclear reactor pressure vessel 1 in which a reactor core 2 is disposed. The reactor core 2 consists of fuel element bundles (not shown) and between which control rods are disposed at different positions. For reasons of clarity only a single control rod arrangement is shown in FIG. 1 and marked with the numeral 3. The control rod arrangement 3 has an absorber portion 4 which has a cross-shaped cross section formed by four wings. These four wings can be better seen in FIG. 2 where the individual wings are marked 5, 5', 5'', and 5'''.

Below the reactor core 2 a control rod guide tube 6 is provided for each control rod arrangement. Each of the control rod guide tubes 6 is coaxial with and is designed, according to the invention to simultaneously serve as the lifting cylinder for the associated control rod. In order to move the control rod in and out of the reactor core 2, a lifting piston 7 bearing the absorber portion 4 slides in the control rod guide tube 6. As illustrated, the lifting piston 7 is directly attached to the absorber portion 7, i.e., no further extension rod is required, and only to the central portion 4' thereof.

In order to enable the absorber portion 4 to be moveable in and out of the reactor core 2, each of the four wings 5, 5', 5'', 5''' of the absorber portion 4 is provided, with a vertical slit 8, 8', 8'', 8''', respectively, which extends upwardly from the lower end of the absorber portion 4 for portion of the height thereof whereby the four wings 5, 5', 5'', 5''' are only connected to central portion 4' near the upper end thereof. The four vertical slits 8, 8', 8'', 8''' are each formed at the same distance from the coordinate origin of the four wings, i.e. the axis of the control rod, which distance as illustrated corresponds to the radius of the control rod guide tube 6, so that the wall of the control rod guide tube 6 can pass into the slits when the absorber portion 4 is removed from the reactor core 2.

Figure 2:
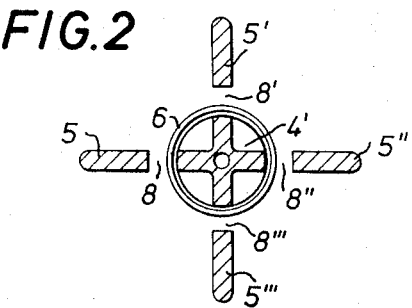
FIG. 2 is a horizontal sectional view through the absorber portion of the control rod arrangement according to FIG. 1 along the line A—A.

These features of construction of the absorber portion 4 are shown more clearly in FIG. 2. As can be easily seen in this figure, the central portion 4' of the cross-shaped absorber portion 4 slides in the interior of the control rod guide tube 6, while the wings 5, 5', 5'' and 5''' pass over the exterior of control rod guide tube 6. As a result of the particular construction of the absorber portion 4 the height required below the reactor core 2 is only substantially that of the absorber portion 4 and, moreover, since the control rod guide tube 6 has a diameter which only encloses a portion of the cross section of the absorber portion, the flow cross section below the reactor core 2 is only slightly or not at all reduced as compared to prior art arrangements.

It should be noted that although the control portion 4' of the absorber portion 4, i.e., the portion which is enclosed by the control rod guide tube 6, is illustrated as having a cross-shaped cross section, it is to be understood that this is not required according to the invention. For example, if desired the portion 4' can be designed as a rod (circular cross section).

Figure 3:
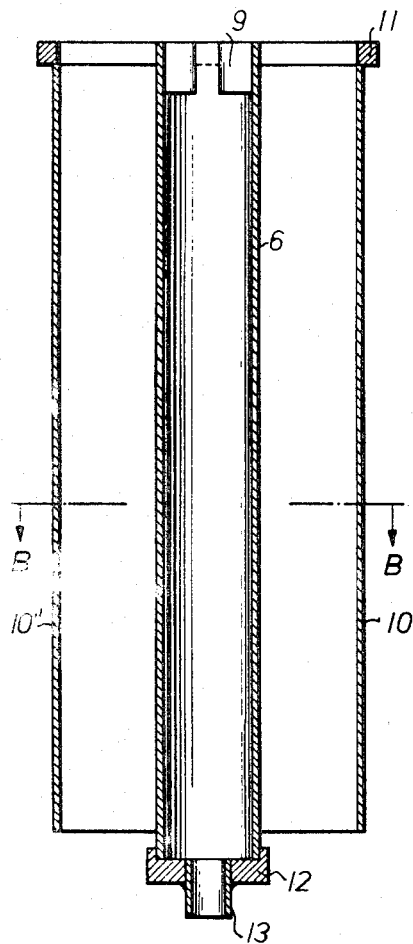
FIG. 3 is an enlarged representation of a preferred embodiment of a lifting cylinder according to the invention in a vertical section with a throttle means inserted.
Figure 4:
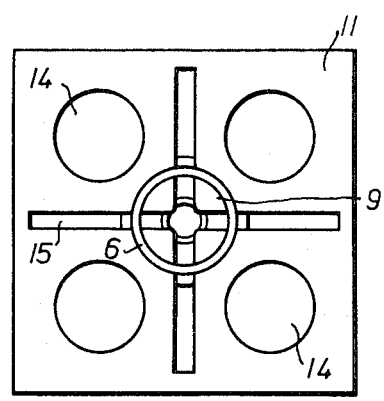
FIG. 4 is a plan view of the lifting cylinder of FIG. 3.
Figure 5:
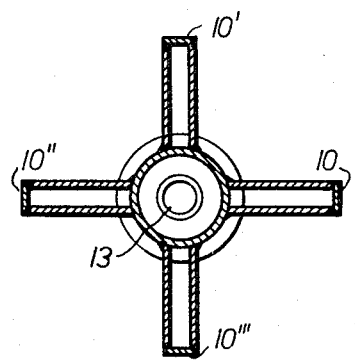
FIG. 5 is a sectional view through the lifting cylinder according to FIG. 3 along the line B—B.

Turning now to FIGS. 3, 4 and 5, the constructive details of the preferred embodiment of the control rod guide tube 6 which simultaneously serves as the lifting cylinder are shown. As illustrated in FIG. 3, the control rod guide tube 6 is preferably provided in its upper portion with a throttle 9, which is cross-shaped. The lifting piston 7 is also designed so that a fitting counterpiece (not shown) passes into the throttle 9 and thus decelerates the absorber rod with increasing throttling during a rapid locking action. The lower end of the guide tube 6 is provided with a cap 12 having an inlet pipe 13 through which a pressure medium is introduced thereinto.

The upper end of the control rod guide tube 6 is additionally provided with a support plate 11 which as illustrated in FIG. 4 supports four fuel elements at the locations indicated by the circles 14. The support plate 11 also contains a cross-shaped opening 15 through which the wings of the absorber portion of the control rod pass when the absorber portion is inserted or withdrawn from the reactor core 2. As shown in FIG. 5, the control rod guide tube 6 preferably is provided with four rib-shaped pockets 10, 10', 10'', and 10''' in which the control rod wings 5, 5', 5'' and 5''' respectively move and are received during movement of the control rod arrangement 3.

It will be understood that the above description of the present invention is susceptible to various modifications, changes and adaptations, and the same are intended to be comprehended within the meaning and range of equivalents of the appended claims.

We claim:
1. In a control rod arrangement for a nuclear reactor including a reactor core, a control rod having an absorber portion with a cross-shaped cross section formed by four wings mounted below said reactor core, a control rod guide tube, mounted below said reactor core and coaxial with said control rod for supporting and guiding said control rod when it is withdrawn downwardly from said reactor core, and a lifting piston connected to the lower end of said control rod and mounted for movement within a lifting cylinder, the improvement wherein said control rod guide tube is designed to simultaneously serve as the lifting cylinder for said lifting piston, and wherein said absorber portion includes means for allowing said wings of said absorber portion to pass over the exterior surface of said control rod guide tube while said lifting piston moves inside said guide tube when said control rod is withdrawn downwardly from said reactor core, whereby the structural height required in said reactor below said core is substantially the same as the height of said absorber portion.

2. The control rod arrangement defined in claim 1 wherein said means comprises a vertical slit extending from the lower edge of each of said wings of said absorber portion, each of said slits extending vertically for only a portion of the height of each of said wings and being at the same distance from the axis of said absorber portion, said distance being such that the wall of said control rod guide tube extends into said slits when said absorber portion is withdrawn downwardly from said reactor core.

3. The control rod arrangement defined in claim 2 wherein said control rod guide tube is provided with four wing shaped pockets extending laterally from the outer surface of the wall thereof, said pockets being located and having a shape such that they receive said wings of said absorber portion when said absorber portion is withdrawn downwardly from said reactor core.

4. The control rod arrangement defined in claim 3 wherein the portion of said control rod which extends into said guide tube also has a cross-shaped cross section.

5. The control rod arrangement as defined in claim 4 further including a throttle having a cross-shaped cross section mounted in the upper end of said control rod guide tube.

References Cited

UNITED STATES PATENTS 3,395,781   8/1968   Trocki et al. -------- 176—36 R

FOREIGN PATENTS 42,788   5/1966   Germany ---------- 176—36 R

CARL D. QUARFORTH, Primary Examiner

H. E. BEHREND, Assistant Examiner

U.S. Cl. X.R.

176—86 R